United States Patent

Krug et al.

(10) Patent No.: US 9,133,659 B2
(45) Date of Patent: Sep. 15, 2015

(54) SEAL PROFILE OF A DOOR SEAL

(71) Applicant: Hübner GmbH & Co. KG, Kassel (DE)

(72) Inventors: Lars Krug, Immenhausen (DE); Thomas Busch, Reinhardshagen (DE)

(73) Assignee: Hübner GmbH & Co. KG, Kassel (DE)

(*) Notice: Subject to any disclaimer, the term of this patent is extended or adjusted under 35 U.S.C. 154(b) by 0 days.

(21) Appl. No.: 14/296,811

(22) Filed: Jun. 5, 2014

(65) Prior Publication Data

US 2014/0360100 A1 Dec. 11, 2014

(30) Foreign Application Priority Data

Jun. 5, 2013 (EP) .................................... 13002883

(51) Int. Cl.
*E06B 7/18* (2006.01)
*E06B 7/23* (2006.01)
*B60J 10/00* (2006.01)
*B60J 10/08* (2006.01)
*E06B 7/22* (2006.01)

(52) U.S. Cl.
CPC ............ *E06B 7/2314* (2013.01); *B60J 10/0011* (2013.01); *B60J 10/0014* (2013.01); *B60J 10/0037* (2013.01); *B60J 10/0091* (2013.01); *B60J 10/085* (2013.01); *E06B 7/22* (2013.01); *E06B 7/2303* (2013.01); *E06B 7/2318* (2013.01)

(58) Field of Classification Search
CPC ....... E06B 7/2314; E06B 7/22; E06B 7/2302; E06B 7/2318; B60J 10/0011; B60J 10/0014; B60J 10/0037; B60J 10/0091; B60J 10/085

USPC ................... 49/475.1, 477.1, 479.1; 277/646; 428/121, 122, 123
See application file for complete search history.

(56) References Cited

U.S. PATENT DOCUMENTS

| 2,635,915 A | | 4/1953 | McKinney | |
| 2,720,011 A | * | 10/1955 | Krupp | 49/477.1 |
| 3,042,980 A | * | 7/1962 | Brinsmade | 49/477.1 |
| 3,161,229 A | * | 12/1964 | Sanders | 160/40 |
| 3,178,779 A | * | 4/1965 | Clark et al. | 277/646 |
| 3,701,500 A | * | 10/1972 | Zeffer et al. | 244/103 R |
| 5,209,498 A | * | 5/1993 | Colin | 277/646 |
| 5,499,475 A | | 3/1996 | Court et al. | |
| 6,623,832 B2 | * | 9/2003 | Greven | 428/121 |
| 7,178,810 B1 | * | 2/2007 | Kuhary | 277/646 |
| 8,397,431 B2 | * | 3/2013 | Krahl | 49/141 |
| 2009/0243142 A1 | | 10/2009 | Roux et al. | |
| 2012/0317887 A1 | * | 12/2012 | Duelli | 49/477.1 |
| 2013/0126106 A1 | | 5/2013 | Hindman | |

FOREIGN PATENT DOCUMENTS

| DE | 10022050 A1 | 11/2001 |
| DE | 10124484 C1 | 11/2002 |
| EP | 1452374 A2 | 9/2004 |
| GB | 2439531 A | 1/2008 |
| JP | 05319181 B2 | 10/2013 |

* cited by examiner

*Primary Examiner* — Jerry Redman
(74) *Attorney, Agent, or Firm* — Gifford, Krass, Sprinkle, Anderson & Citkowski, P.C.; Douglas L. Wathen

(57) ABSTRACT

A door seal for a doorway in a vehicle for public passenger transportation has at least one reinforcing element coated with an elastomer, the reinforcing element having a lesser elasticity in the longitudinal direction of the seal than in the transverse direction.

17 Claims, 2 Drawing Sheets

SEAL PROFILE OF A DOOR SEAL

CROSS-REFERENCE TO RELATED APPLICATION

This application claims priority of European Patent Application No. EP 13 002 883.0, filed Jun. 5, 2013, the content of which is incorporated herein in its entirety.

FIELD OF THE INVENTION

The invention relates to a seal profile, having a hollow space, of a door seal of a doorway in a vehicle for public passenger transportation, more specifically of a high-speed train, the seal profile having at least one connecting member to be received by the coachwork and/or the door of the vehicle.

BACKGROUND OF THE INVENTION

A door seal for a high-speed rail vehicle is sufficiently known from the prior art. Such seals are highly stressed when used in doors of high-speed trains because the doors move with a considerable force against the seals in the door opening, thus subjecting the seals to a strong deformation. This is necessary to prevent the pressure surges, which occur when the high-speed train is moving and which act against the outer shell of the train, e.g. when two trains meet or when a train enters a tunnel, from entering into the interior of the vehicle.

US2009/243142 A1 discloses a seal with a connecting member, the connecting member serving for example for fixation on the coachwork of a vehicle. The connecting member has a support made of metal with a U-shaped cross-section, the support having several slots disposed in a row transversely to the longitudinal axis. The support is coated with an elastomer. The slots in the support serve to adapt the connecting member to the shape of the coachwork. The seal, which is disposed on the connecting member, has a hollow space and consists apparently of an elastomer.

Up to now seals with a complex cross-section were manufactured by vulcanisation in a mould. This is extremely complicated, particularly considering that a multitude of doors of different sizes must be equipped with such seals, wherein at least one moulding tool needs to be provided for each seal profile of each door type. This means that the expense required for providing the appropriate moulding tools, but also the manufacturing effort itself, are enormous as a consequence of job production in a mould.

SUMMARY OF THE INVENTION

The problem underlying the invention therefore consists in solving this problem. The problem more specifically consists in being able to manufacture door seals, including with a complex cross-section, at a lower cost. In order to be able to manufacture such a seal of the type mentioned in the introduction at a lower cost, the invention provides that the seal has at least one reinforcing element coated with an elastomer, the reinforcing element having a lesser elasticity in the longitudinal direction of the seal than in the transverse direction. Thereby, it is achieved that such a seal with such a reinforcing element can be manufactured by extrusion. Up to now, it was assumed that seals with complex cross-sections with reinforcements were not producible by extrusion. The reason for this is that the reinforcing element folds during the extrusion in the extrusion tool. Since the reinforcing element is now more rigid in the longitudinal direction of the seal, i.e. in the extrusion direction, than in the transverse direction, the formation of such folds during the extrusion is avoided.

It has already been pointed out that the object of the invention is seals, more specifically with a complex form or contour. Such a complex seal is characterized in that the wall of the seal has a drawn-in area in the area of the sealing lip. In the drawn-in or vaulted state of the seal, the wall of the seal has a contour with a U-shaped cross-section in the area of the sealing lip.

Furthermore, it is more specifically provided that the reinforcing element has a plurality of more specifically oval or diamond-shaped openings extending in the longitudinal direction of the sealing profile. Regarding the arrangement of the oval or diamond-shaped openings, it is provided that several rows of such openings are provided, the openings of the individual rows being staggered relative to each other. More specifically thanks to these openings extending in the longitudinal direction of the profile, and here more specifically very narrow oval openings, a high stability of the reinforcement in the longitudinal direction, i.e. in the direction of extrusion, is achieved. In the transverse direction however, the reinforcing element is highly flexible, which entails another advantage, which is that by inflating such a seal in the mounted state, in order to increase the sealing force between the door on the one hand and the frame of the vehicle on the other hand, or also between two doors, the seal can go through a great volume change, which increases the seal effect. Stated another way, the reinforcing element allows the seal to inflate from a non-inflated to an inflated state and expand in the transverse direction thereby sealing while being stable and not expanding in the longitudinal direction. The consequence of this is that the seal no longer has to be squeezed as much as in the prior art, the consequence being that the seal is subjected to less wear.

In this respect, according to another feature of the invention, means for inflating the seal are provided on the seal, the means for inflating the seal being more specifically a valve.

The seal has at least one connecting member to be received by the coachwork or the door of the vehicle. It has already been pointed out that the seal can be disposed on the front side of the door as well as on the front side of the frame of the coachwork of the vehicle. According to another feature of the invention, the connecting member is designed in the manner of a rail and is preferably made of an elastomer, so that the seal can be extruded in one piece together with the connecting member. The connecting member itself has grooves extending in the longitudinal direction of the seal, in order to be able to insert this seal into the front side of the door and/or the front side of the frame on the coachwork side by clipping it in.

According to another feature, the seal has a sealing lip, which preferably protrudes outward on the front side, i.e. is oriented toward the front side of the door or the front side of the frame on the coachwork side, depending on the installation.

The sealing lip, which is preferably also made of an elastomer, is disposed preferably in the middle of the seal in a parallel direction to the door surface. The arrangement of the sealing lip as well as the arrangement of the connecting member on the seal is such that the reinforcing element protrudes at least into the sealing lip or the connecting member, in order to effect a stable connection between the reinforcing element coated with an elastomer and the sealing lip or the connecting member. From this it is clear that the seal consists of four elements, namely two lateral parts or two sidewalls, comprising the reinforcing element coated with an elastomer and the connecting member on the one front side of the seal profile and, on the opposite side, the sealing lip, which is also connected to the sidewalls of the seal.

When manufacturing a seal of the type described above by extrusion, it has turned out to be particularly advantageous, if a silicone rubber is used as an elastomer. The reason for this is that silicone has excellent sliding properties for extrusion, which makes it possible to maintain a low friction resistance during passage through the extrusion tool, the consequence being that the formation of folds in the reinforcing element is also substantially avoided.

In the following, the invention is exemplarily described in more detail based on the drawings. In the drawings:

BRIEF DESCRIPTION OF THE INVENTION

DETAILED DESCRIPTION OF THE INVENTION

The vehicle 1 has a door opening 3 with the door 5 in its coachwork 2. The door 5 can be designed as a sliding plug door or as a pivoting door, for example.

Figure 1:
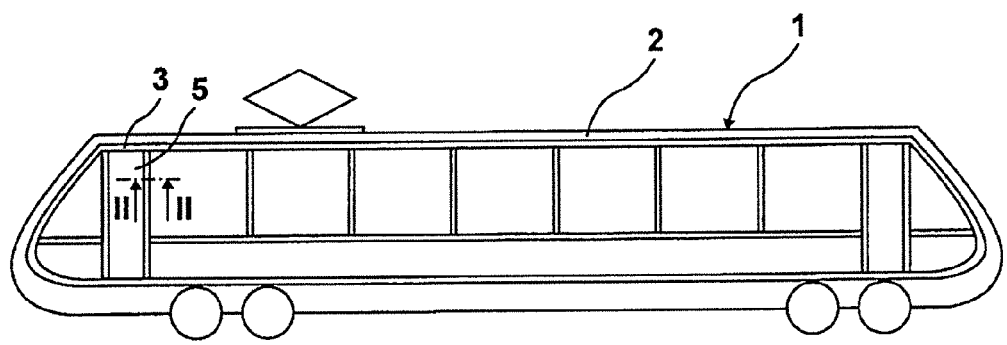
FIG. 1 is a schematic of a vehicle for public passenger transportation with a door.
Figure 2:
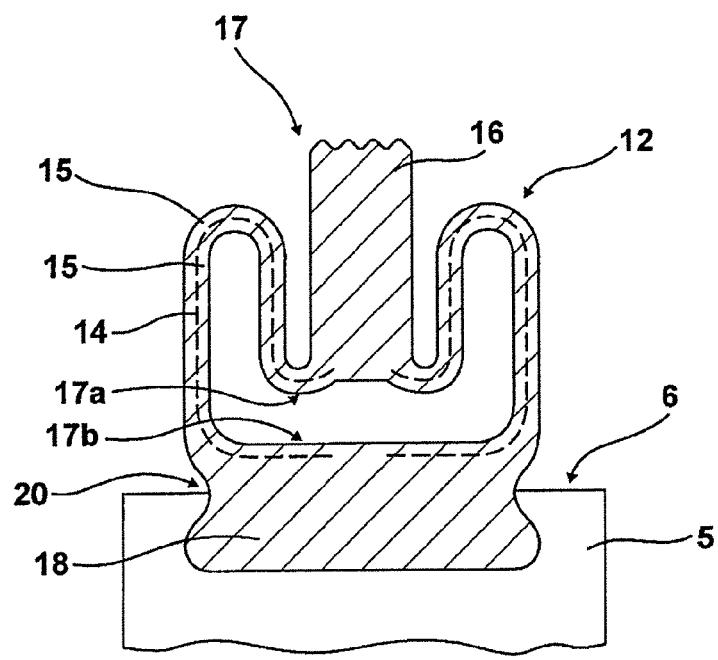
FIG. 2 is a cross-sectional view taken along line II-II in FIG. 1.
Figure 3:
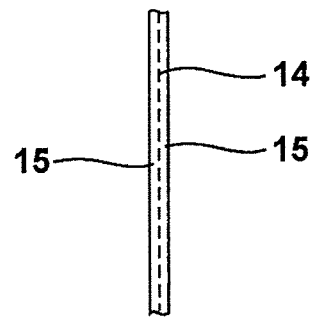
FIG. 3 is a cross-sectional view taken along line in FIG. 2.
Figure 4:
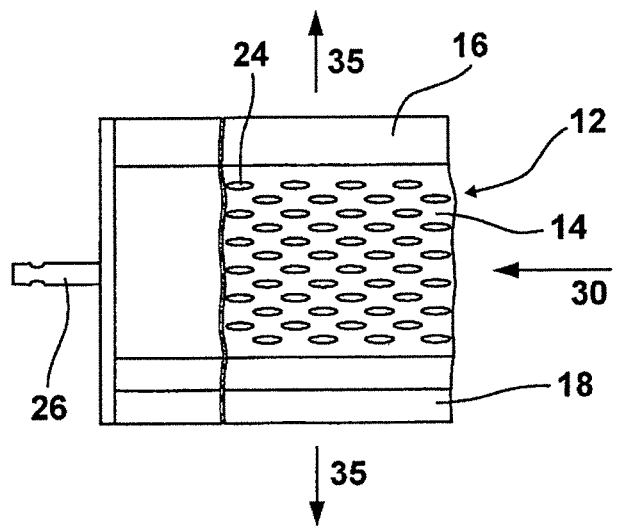
FIG. 4 is a detailed lateral view of a seal according to FIG. 2, wherein the door receiving the seal profile has been left out.

The design of the seal can be gathered in detail by looking at FIGS. 2 to 4. FIG. 2 shows the seal 10 in a sectional representation, the seal being received by the door 5. It is noticeable that the seal 10 has a reinforcing element 14 in the area of both walls 12, which is coated with an elastomer layer 15, e.g. a silicone rubber. The elastomer coating can be carried out on both sides of the reinforcing element 14 or only on one side. On each side, the wall 12 ends in the sealing lip 16 and in the connecting member 18, the connecting member 18 having grooves 20 on both sides in the area of the transition to the wall 12 extending in the longitudinal direction, which allows for a clip-on arrangement on the front side 6 of the door 5 or the coachwork 2. An essential part of the design of the seal 10 is that the respective reinforcing element 14 in the area of the wall 12 protrudes on the one hand into the connecting member 18 and on the other hand into the sealing lip 16, in order to effect a stable connection of the reinforcing element and thereby of the flanks on the connecting member 18 on the one hand and on the sealing lip 16 on the other hand. The reinforcing element itself, which is formed by a woven fabric or a warp-knitted fabric or a weft-knitted fabric for example, is advantageously equipped with the elastomer layer 15 on both sides. The configuration of the reinforcing element 14 can be seen in detail in FIG. 4. The reinforcing element 14 has several superimposed rows of slim oval openings 24 that are elongated in the longitudinal direction of the seal, which cause the reinforcing element 14 to be substantially non-elastic in the longitudinal direction (arrow 30) but extremely elastic in the transverse direction (arrow 35). This is explained by the fact that the openings 24 with a slim oval form, which are shown in FIG. 4, are able to bulge in the direction of the arrow 35 when a tension is exerted in that direction, in order to be able to provide the desired elasticity in that direction when the seal is inflated. The same correspondingly applies to diamond-shaped openings.

The design of the reinforcing element can also be such that a foil made of a plastic, e.g. a polyethylene or polypropylene is equipped with the slim oval openings described above e.g. by die cutting or punching.

The seal with a complex cross-sectional design according to FIG. 2 has a drawn-in area 17 in the area of the sealing lip 16. This means that the area 17a of the wall 12, which receives the sealing lip 16, is vaulted toward the area 17b facing the wall 12 with the connecting member 18, the hollow space of the seal profile being downsized in the process. This means that the profile has a contour with a U-shaped cross-section. It has already been pointed out that seals, more specifically with a complex shape or contour, are the object of the invention. To sum up, such a complex seal is characterized in that the wall of the seal has a drawn-in area in the area of the sealing lip. In this respect, the seal as a whole, in its drawn-in or vaulted state, has a contour with a U-shaped cross-section (FIG. 2).

In this regard, in FIG. 4, a schematic of a valve 26 is visible, by means of which the seal profile can be inflated. When the seal profile is inflated, the seal takes up a rectangular shape, wherein the sealing lip protrudes outwards. This means that due to the internal pressure, the seal 10 will be deformed in the direction of the orientation of the sealing lip 16, i.e. in the direction of the arrow 40. Thereby, the individual openings 24 in the reinforcing element 14 of the flanks 12, which at first have a longitudinally extending oval shape, then more specifically take up a more round shape. In contrast, by creating a negative pressure, the profile can be contracted, i.e. brought into the shape according to FIG. 2. Since the sealing lip does not protrude from the seal, there is no risk of damaging the sealing lip when the door is brought into its closed position.

LIST OF REFERENCE NUMBERS 1 vehicle
2 coachwork
3 doorway
5 door
6 front side of the door or the coachwork
10 seal
12 wall of the seal
14 reinforcing element
15 elastomer layer
16 sealing lip
17 drawn-in area
17a area of the wall with the sealing lip
17b area of the wall with the connecting member
18 connecting member
20 grooves on the connecting member
24 oval openings
26 valve in the seal profile
30 arrow
35 arrow
40 arrow

The invention claimed is:

1. An inflatable door seal for a public transportation vehicle, the seal comprising:
   a connecting member for connecting the seal to a door or coachwork of a vehicle;
   at least one reinforcing element coated with an elastomer;
   wherein the seal defines a hollow space therein, the at least one reinforcing member substantially surrounding the hollow space;
   wherein the reinforcing element has a first elasticity in a longitudinal direction of the seal and a second elasticity in a transverse direction of the seal, the first elasticity being less than the second elasticity such that the reinforcing element allows the seal to inflate from a non-inflated to an inflated state and expand in the transverse direction thereby sealing while being stable and not expanding in the longitudinal direction; and wherein the door seal is extruded.

2. An inflatable door seal in accordance with claim 1, wherein the reinforcing element is a woven fabric, a warp-knitted fabric, a weft-knitted fabric or a foil.

3. An inflatable door seal in accordance with claim 1, wherein the reinforcing element has a plurality of openings defined therein, the plurality of openings each extending in the longitudinal direction of the seal.

4. An inflatable door seal in accordance with claim 3, wherein the openings are disposed in rows, the rows of openings being staggered relative to each other.

5. An inflatable door seal in accordance with claim 3, wherein the openings have an oval or diamond shape.

6. An inflatable door seal in accordance with claim 1, further comprising a means for inflating the seal.

7. An inflatable door seal in accordance with claim 1, wherein the connecting member is configured as a rail.

8. An inflatable door seal in accordance with claim 1, wherein the connecting member is made of an elastomer.

9. An inflatable door seal in accordance with claim 8, wherein the elastomer is a cross-linked silicone rubber.

10. An inflatable door seal in accordance with claim 1, wherein the connecting member has grooves on both sides extending in the longitudinal direction of the seal.

11. An inflatable door seal in accordance with claim 1, further comprising a sealing lip.

12. An inflatable door seal in accordance with claim 11, wherein the sealing lip is disposed approximately in the middle of the seal and oriented in a parallel direction to a surface of a door.

13. An inflatable door seal in accordance with claim 11, wherein the seal has a wall which is drawn-in in an area of the sealing lip.

14. An inflatable door seal in accordance with claim 13, wherein the seal has a contour with an approximately U-shaped cross-section in the area of the sealing lip.

15. An inflatable door seal in accordance with claim 11, wherein a central axis is defined connecting the sealing lip and the connecting member, the at least one reinforcing element comprising a reinforcing element on both sides of the central axis.

16. An inflatable door seal for a public transportation vehicle, the seal comprising:
  a connecting member for connecting the seal to a door or coachwork of the vehicle;
  at least one reinforcing element coated with an elastomer;
  wherein the seal defines a hollow space therein, the at least one reinforcing member substantially surrounding the hollow space; and
  wherein the reinforcing element is substantially inelastic in a longitudinal direction of the seal and is elastic in a transverse direction of the seal such that the reinforcing element allows the seal to inflate from a non-inflated to an inflated state and expand in the transverse direction thereby sealing while being stable and not expanding in the longitudinal direction.

17. An inflatable door seal for a public transportation vehicle, the seal comprising:
  a connecting member for connecting the seal to a door or coachwork of the vehicle;
  at least one reinforcing element coated with an elastomer;
  wherein the seal defines a hollow space therein, the at least one reinforcing member substantially surrounding the hollow space; and
  wherein the reinforcing element has a plurality of oval or diamond shaped openings defined therein, the openings being substantially longer in a longitudinal direction of the seal than in a transverse direction of the seal, wherein the seal has a first elasticity in the longitudinal direction of the seal and a second elasticity in the transverse direction of the seal, the first elasticity being less than the second elasticity such that the reinforcing element allows the seal to inflate from a non-inflated to an inflated state and expand in the transverse direction thereby sealing while being stable and not expanding in the longitudinal direction.

* * * * *